Patented Jan. 7, 1936

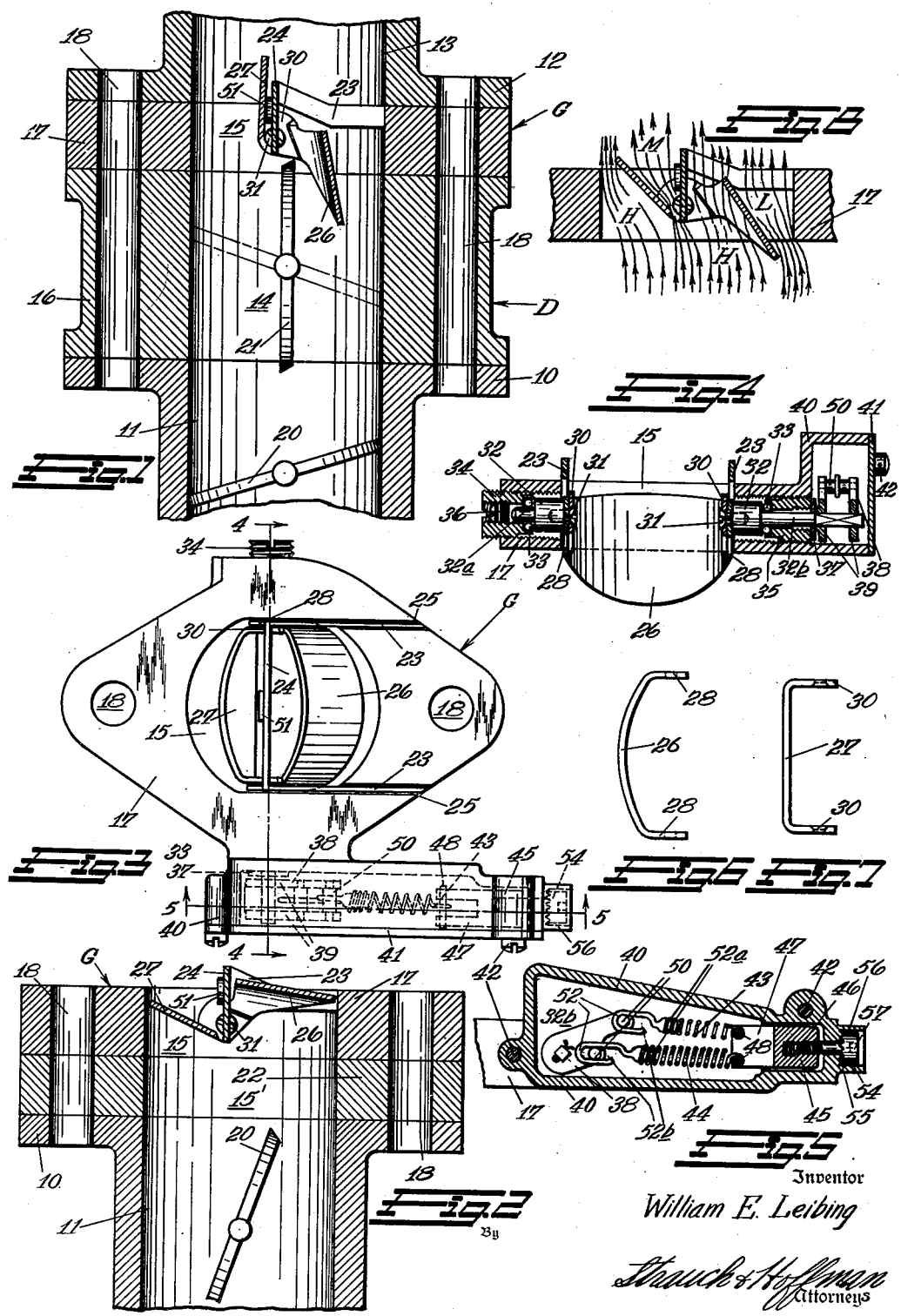

2,026,947

UNITED STATES PATENT OFFICE 2,026,947

METHOD AND APPARATUS FOR GOVERNING FLOW LINES

William E. Leibing, Sausalito, Calif., assignor to Leibing Automotive Devices, Incorporated, San Francisco, Calif., a corporation of Nevada Application May 31, 1932, Serial No. 614,533

23 Claims. (Cl. 137—152)

This invention relates to a method and apparatus for governing the rate of quantity of fluid flow through a conduit. More particularly, the present invention relates to such a method and apparatus specially designed for use in association with the intake manifold of a combustion engine for the purpose of automatically preventing the latter from operating above a predetermined maximum speed.

Still more specifically, this invention relates to flow governing in response to fluid velocities, aided by pressure differentials if desired; and the preferred embodiment is of the throttling valve type inserted in the conduit to be governed.

I am aware of prior proposals to govern fluid flow with valves inserted in the flow conduits, but I know of no patented or marketed device which is not open to at least several of numerous serious objections, chief among which are as follows.

Old style governors have a marked tendency to flutter when they are near or at a position corresponding to maximum permissible flow, they do not respond properly to slight flow variations, and they operate through too great a range of speed near the maximum closed position. For example, on an engine governed at 1800 R. P. M., they will commence to flutter and lose power at 1600 R. P. M., or less, so that the engine operates sluggishly and inefficiently when approaching the governed speed.

Existing governors have the further disadvantage that their valves offer too much restriction to flow, and set up eddy currents which are detrimental not only to the course of flow but also to the fuel mixture itself. As a result, an engine of 100 H. P. rating may develop as little as only 75 H. P. below the governed maximum speed.

Most existing governors also require delicate springs, intricate cams, vacuum pistons and other equipment tending toward complexity of design with resultant maintenance problems and costs. They also have bearings that are open to both vacuum and atmosphere, and thus are difficult to maintain in lubricated condition and are subject to accumulation of dust and grit. These unsolved problems destroy smooth valve oscillation and sensitivity.

A substantial amount of room is required for the insertion of a governor between the carburetor and manifold flanges, and serious installation problems arise when existing complex and sizable governors are to be installed, especially where other attachments are desirable also in a similar location.

It is the primary object of the present invention to overcome all of the above defects and disadvantages. More specifically stated, some of the major objects of my invention are to provide a flow governor which is compact and simple, requiring but little space and substantially no attention; which is highly sensitive without fluttering; which acts quickly in both directions at the set maximum position and at that time produces a large change in flow area upon slight valve movement, and which develops no fluid traps or eddy currents, thereby minimizing flow resistance when the valve is near closure; which embodies a throttle valve so designed as to substantially float smoothly in the fluid stream, without resistance to flow when it is at or near its open inoperative position; which embodies a yieldable stop for controlling the maximum opening; and which has a novel selective adjustment designed to ensure special, desirable valve action.

A further major object of this invention is to provide an improved throttle valve structure, especially designed for governing fluid flow, but also suitable for use as a controlling or accelerating throttle valve. In this connection it is an object to devise an improved method for throttling the fuel supply to a combustion engine.

Another object of the present invention is to associate a flow governing valve with the flow regulating (throttle) valve of a combustion engine so that the action of the former is in great part dependent upon the position of the latter.

A further object of this invention is to devise a method of governing flow in response to both velocities and pressure differentials, and to provide a governor suitable for carrying out the method.

Additional objects, many of a subordinate or more specific nature, will appear from a study of the following detailed description and its appended claims, when taken in conjunction with the accompanying drawing, wherein:

Figure 1 is a longitudinal sectional view taken centrally through a portion of an intake manifold having a preferred form of the governor of the present invention mounted therein in association with a de-gassing device.

Figure 2 is a view similar to Figure 1, but having a spacer substituted for the de-gasser and showing the governor valve in an extreme substantially closed position.

Figure 3 is a plan view of the governor seen in Figures 1 and 2, with the valve thereof shown in partially open position.

Figure 4 represents a cross section taken on the plane indicated by the line 4—4 in Figure 3.

Figure 5, in a sectional view taken on the plane of line 5—5 in Figure 3, shows the valve biasing, controlling and adjusting mechanism.

Figure 6 is a detail view seen when looking edgewise upon the leading wing or power vane of the governor valve.

Figure 7 is a similar representation of the stabilizing or trailing wing of the governor valve.

Figure 8 is a fragmentary sectional view, similar to the governor illustrations of Figures 1 and 2, showing the valve and the fluid conditions adjacent thereto when it is approximately in the same position as in Figure 3.

With continued reference to the drawing, wherein like characters are employed to designate like parts, and with particular reference for the moment to Figure 1.

Numeral 10 designates the apertured flange of the throttled passageway 11 of a carburetor. This flange is designed for attachment to the flange 12 of an intake manifold 13, but has been separated therefrom to provide a space for the reception of a de-gassing device D and a flow governor G. The device D and the governor G have substantially cylindrical bores, 14 and 15 respectively, aligned with the passageway 11, which bores are formed within blocks or body portions 16 and 17 respectively. These blocks are similar in shape to the flanges 10 and 12 and cooperate with the latter to form continuous vertical holes 18 for assembling bolts. The governor block is of thin wafer formation and hence takes but little vertical space—e. g., only one-half inch.

The carburetor outlet contains a conventional throttle valve 20 designed to be opened and closed manually to control the quantity of fuel mixture drawn into the intake manifold. The de-gassing device embodies a similar valve 21 which, however, is automatically controlled. This device forms no part of the present invention, except in general combination, and hence the full details of its structure are not shown. Suffice it to say here that the valve 21 normally is in the illustrated open position, and closes only when the valve 20 has been shut and the engine vacuum has gone below proper idling vacuum. The primary purpose of the device is to prevent unburned fuel from being discharged through the engine exhaust, and the illustrated device may take the form of that fully disclosed in copending application Serial No. 568,844, filed October 14, 1931.

The governor of course may be used independently of the de-gassing device, and mounted adjacent the carburetor flange 10 as in Figure 2. In this event, however, when the governor is applied as an attachment to existing carburetors wherein the throttle valve 20 is disposed close to the flange 10, it will be necessary to provide a spacer 22 for preventing the valve 20 from engaging the governor valve during operation. This spacer has a bore 15' aligned with the bore 15, and may be formed either as a separate element or as an integral extension of the block 17.

The governor consists essentially of an adjustable valve mechanism for throttling the pasageway 15 when the engine reaches a predetermined maximum speed. As previously pointed and with this mechanism must operate smoothly and with great sensitivity, and must present no substantial restriction to fuel flow at engine speeds below the governed maximum. These necessary characteristics are present in the following described mechanism.

A substantially U-shaped member, comprising a pair of legs 23 interconnected by a straight flat bridge 24, is incorporated in the assembly by anchoring its legs in slots 25 in the block 17 in such manner that the bridge extends horizontally across the bore 15 with its side surfaces in vertical planes. The bridge 24 thus does not offer restriction to fluid flow. The legs 23 likewise have their surfaces in vertical planes, and they engage the diametrically opposite and slightly flattened sides of the bore 15. The legs 23 are of such length as to position the stationary bridge 24 slightly offset from the axis of the bore for a purpose later apparent. The bridge serves several important functions, presently explained.

Associated with the stationary bridge 24 is a governing throttle valve comprising a power vane 26 and a stabilizing vane 27 mounted for unitary oscillation about a horizontal axis that is offset in the same plane as that of the bridge. These vanes have short offset pivoting arms 28 and 30 respectively which impart to them a U-shape when viewed edgewise as in Figures 6 and 7 respectively.

The legs 28 are spaced for disposal closely adjacent the flattened portions of the bore 15, and the legs 30 are spaced so that they fit within the legs 28. A pair of screws 31 are employed to securely fasten the pairs of engaged legs, at a desired fixed angle relative to each other, upon the enlarged portions 32 of a pair of rotatable supporting shafts 32a and 32b. These shafts and enlarged portions cooperate with ball bearings 33 and a pair of externally threaded bushings 34 and 35 in such manner that both lateral and axial thrusts are taken by the bearings as the pivoted governor valve is acted upon by various forces during operation. The inner diameters of the bushings are less than the shaft diameters for that purpose, and the outer ends are provided with screw driver slots to facilitate their insertion and to permit convenient adjustment of the play in the bearings.

The bushing 34 is sealed from the atmosphere by a screw plug 36. Since the shaft 32b projects through and beyond the other bushing, 35, the latter is sealed differently by an antifriction gasket 37 at its outer end. It will thus be seen that the vacuum and flow conditions in the bore 15 can not cause dust and other injurious substances to be drawn into the bearings from the atmosphere.

The outer end of the shaft 32b is squared for non-rotative reception in a square hole in one end of a radial rigid lever 38. The lever 38 comprises a pair of arms 39 spaced in parallelism by a pair of pins, 50. Adjacent this lever the block 17 is shaped to provide an integral extension in the form of a box 40 designed to be closed by a cover plate 41 and screws 42. The box 40 houses the lever 38, a pair of governing springs 43 and 44, and adjusting mechanism comprising a yoke 45 held in position by a special screw 46.

The forked ends 47 of the yoke 45 carry pins 48 to which one end of each coil spring is attached. The opposite ends of the springs are connected to the pins 50 by means of special hooks 52. These hooks have threaded portions 52a which adapt them for ready attachment to the coil springs merely by screwing them into the latter. The thread grooves being of substantially the same size as the wire of the springs and of similar pitch when the springs are relaxed, the connections are firm in an axial direction while permitting ready axial adjustment by the performance of a screwing or unscrewing operation. The hooks also have slots 52b which permit convenient attachment to the pins 50 as well as removal therefrom. The hooks could be formed as integral portions of the springs in well known manner, but the illustrated arrangement is preferable because of its greater permanence and its convenience of adjustment to vary the spring tensions.

The tension of the spring 43 normally urges the lever 38 into that position illustrated in Figure 5, corresponding to the wide open valve position seen in Figure 1. In this position the throttle valve vane 27 is yieldingly held in engagement with a spacer or stop element 51 rigidly carried by the bridge 24; and at this time the corresponding pin 50 is in the end of its slot 52b and preferably is offset from a vertical line through the shaft end so that, when the lever oscillates in a counter clockwise direction in Figure 5 in response to closing movement of the governor valve, the resistance to valve movement will uniformly increase due to increasing length of the effective crank arm between the upper pin 50 and the shaft 32b as well as due to the stretching of the spring.

The hooked end of the spring 44 is slidably fitted on the periphery of the lower pin 50 that is carried by the lever 38. The pin does not abut the looped end of the hook and tend to stretch said spring until the lever has oscillated to a predetermined position. This position, as well as the resistance of the other spring, 43, may be variably selected by rotation of the head 54 of the adjusting screw 46. This adjustment causes the yoke 45 to move toward or from the lever 38, and the selected relationship is maintained by the cooperation of a notched under surface on the head 54 with a similar mating surface on the box 40, as seen at 55. The head preferably is concealed within a sleeve 56 formed on the box and provided with a small square recess 57 requiring the use of a special key for adjusting it. This is done to prevent tampering and, as further assurance against unauthorized adjustment, the open end of the sleeve 56 may be closed by a special seal designed to betray its removal.

With further reference to the structure of the governing throttle valve, the power vane 26 is given an approximately cylindrical curvature between its pivot legs 28 so as to form a scoop for the fuel currents in which it is immersed. In addition, it preferably has greater effective exposed area than has the other vane 27, and is disposed at a greater distance from the pivotal axis than is the latter, whereby the closing torque developed by vane 26 is much greater and more effective than that developed by the vane 27 in resistance to the closing movement of the valve.

The vane 26 is flat, and in its normal open position (drawn against the bridge 24 as in Figure 1) its plane is parallel to the axis of the conduit, whereby it offers no restriction to fluid flow. The vanes are not parallel, vane 26 being set at a slight angle which opens toward the carburetor so that, in the fully open valve position, this vane will produce a rotative component due to its scooping action as the fluid impinges on it. This angle is variable by means of the screws 31, and ordinarily shoud be of the order of that seen in Figure 1, wherein the vane 26 is disposed at an angle of approximately 15 degrees relative to the bridge 24 and vane 27 when in full open position.

The power vane of course must face the carburetor in the illustrated embodiment, and it functions best when disposed on the same side of the conduit as is the closer edge of the main throttle valve 20. In Figure 1, the normally open de-gasser valve 21 assists in directing a stream of fluid against the scooping vane. In Figure 2 the throttle 20 is closer to this vane and acts more direct thereon. If desired, the vane may be set at such an angle that fuel will not impinge thereon until the valve 20 has been opened to a position corresponding closely to that for maximum governed speed, thereby producing no resistance to flow throughout the range of permissible speeds, and causing a snap or trigger movement of the governor valve just before maximum speed is reached.

Assuming that the governor has been installed on a bus and properly adjusted, by means of the screw 46, to prevent the engine from exceeding a speed corresponding to 35 miles per hour, the operation is as follows:

As the engine idles and works at low speeds, the governing valve is held fully open by the spring 43, but when the speed increases to a certain point where the velocity of flow against the power vane 26 overcomes the spring tension the valve oscillates slowly toward closed position. Slight valve movement brings the vane 27 into play to create a resistance augmenting that of the spring. However, the greater effective area and lever arm of the vane 26 is sufficient to overcome the combined resistances. As a matter of fact, for some reason difficult of explanation, the vane 27 seems to lose its power of resistance after substantial movement, but the opposed forces remain nearly balanced due to the increasing resistance of the spring 43 as it stretches and to the increasing length of the effective arm between its pin 50 and shaft 32b.

The second spring, 44, is idle during the initial valve movement, but is so designed that its pin 50 reaches the end of the corresponding slot 52b just before the governor valve reaches its predetermined position of closure. Up to this time the valve movement has been relatively slow, with the power derived from fluid flow increasing uniformly with the spring resistance to valve oscillation, but now there are combined velocity and pressure conditions which suddenly tend to force the valve rapidly shut. These conditions are diagrammatically illustrated in Figure 8, wherein the several valve edges are beginning to throttle the conduit to cause the developement of pressure differences on opposite sides of the valve. High, medium and low pressure areas being designated by the letters H, M and L respectively, it will be seen that the pressure differential cooperates with velocities to force the valve in a counterclockwise direction. The auxiliary spring 44 at this time comes to the aid of the spring 43 and the two springs yieldingly stop further movement of the valve, the final position of the latter of course depending on the predetermined set given to the yoke 45.

It should be observed that, due to special design of the governing valve with its plurality of through openings, the total cross sectional area of flow is not diminished very much nor very rapidly during the greater part of the range of valve oscillation between fully open and partially closed positions. It follows that the valve offers no material restriction to fuel flow and that the engine can develop full power and speed at all velocities below the maximum governed speed.

However, it requires only a small angle of valve oscillation to cause rapid opening and closure of the valve near the governed speed, which means that the device is very sensitive. This is due to the fact that there are four passages in the valve, having four seats for a similar number of valve edges. Each vane has an edge designed to cooperate with the bridge 24 and an edge designed to cooperate with the bore 15 so that it becomes apparent that four-point closure of the governing valve is accomplished when the valve nears its closed position. Having been adjusted for a maximum vehicle speed of 35 miles per hour, the valve is so sensitive that it permits the development of full power up to 34½ miles per hour, and then quickly flips into its final governing position when the throttle 20 is opened further. The combined velocity and pressure conditions impart a trigger action to the valve when the maximum permissible speed corresponds to a substantially closed valve position. The valve also opens with like sensitivity when the throttle 20 moves backward.

The governing valve may be likened to an aeroplane, since its slip-stream design causes it to "fly" a steady course in the fluid current. The power vane 26 acts as a lifting wing, while the trailing vane 27 serves as a stabilizing tail or wing. The combined wings resist fluttering oscillation in response to fluid fluctuations, and thus permit the engine to develop driving torque uniformly in proportion to movement of the throttle 20.

In Figure 2, the governing valve is shown completely closed. Ordinarily the valve will never reach this position, since a vehicle would seldom be held down to such a correspondingly low speed. The valve does not fully close the bore 15, either centrally or adjacent the walls of the latter. However, it is intended to use this type of valve as a substitute for the present inefficient types of main throttle valves, as well as for a governor. When used in place of the usual accelerating valve, such as valve 20 in Figure 2, the valve of the present invention will of course have its vanes enlarged to seat fully against the bridge 24 at their inner edges, and fully against the bore 15 at their outer edges. The chief advantage of this type of valve over existing valves, whether used as main or governing throttles, is as follows.

A butterfly or similar type of valve causes the formation of blind traps at its edges when it is in a partially open position, with resultant production of swirling eddy currents. These eddy currents not only prevent a smooth unbroken flow of fuel direct to the engine but also upset the fluid mixture by permitting much of the vaporized and atomized fuel to come out of the mixture in the form of liquid droplets that are too large for efficient combustion. This condition can readily be observed by suddenly depressing the accelerator pedal of an automobile, and simultaneously noting the appreciably prolonged hissing gasp of the engine as it awaits the inflow of a steady current of correctly atomized fuel mixture.

The valve of the present invention is not subject to the above disadvantages, since its vanes do not provide accentuated flow traps, and since its structure is such as to form four distinct passages therethrough when in opened positions. Moreover, these several passages increase very rapidly in cross sectional area while the valve is oscillating through only a small angle, so that flow restrictions and eddy currents are substantially eliminated when the valve is near its closed position. The resistance of course is even less as the valve is opened farther.

The governing valve of this invention prevents excessive racing of the engine when the latter is idle or being driven, as well as when it is under load. For example, the device is adjusted to prevent engine speed above 1800 R. P. M. under load. Suppose now that the engine is racing with vehicle idle or is being carried downgrade with open throttle, where the same amount of fuel mixture would ordinarily drive the engine faster than if the engine were under load. Under such conditions, the springs 43 and 44 permit the valve to close slightly more than it does for maximum permissible speed under load. It should be noted that if a positive stop were used instead of the yielding stop of the present device, the engine could be run above safe or permissible speed under certain of the above mentioned conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a throttling device for controlling the fluid flow through a conduit of continuous substantially equal cross-sectional area, a valve structure pivoted for oscillation within said conduit about a single axis, said structure comprising a set of spaced interconnected fluid controlling wings designed to provide, upon slight oscillation from closed position, a relatively large effective flow area across the conduit to permit a substantially straight and unrestricted flow through the valve structure, said wings being shaped at their outer edges to engage the walls of said conduit in closed position.

2. In the device defined in claim 1, said wings being spaced apart, and each being shaped and positioned to permit a stream-line flow of fluid past both of its side surfaces when the valve is not in closed position.

3. In the device set forth in claim 1, there being at least two of said wings normally spaced apart to provide a path of fluid flow therebetween, and there being a bridge element disposed within the conduit and with respect to which the spaced wings are designed to seat when the valve is closed.

4. In a throttling valve construction for governing the flow of fluid through a conduit, a pivoted valve structure mounted for oscillation within said conduit about an axis running transversely through said conduit, said valve structure comprising a power vane and a stabilizing vane, said power vane and stabilizing vane being spaced apart to define a space therebetween and being set at an acute angle relative to each other on opposite sides of the valve pivot with the vertex of the angle on the stabilizing vane side of said pivot, said power vane projecting farther than the stabilizing vane from the pivotal axis.

5. In a throttling valve construction for governing the flow of fluid through a conduit, a pivoted valve structure mounted for oscillation within said conduit, said valve structure having a power vane leading into the oncoming fluid on the same side of the valve pivot as is the fluid source, said power vane constituting substantially the entire portion of the valve structure on one side of said axis whereby said power vane tends to oscillate the valve structure in response to variations in fluid flow at all positions of said valve structure, the inner end of said vane being spaced from said axis to form an open space between said axis and said vane.

6. In a governor for the intake conduit of an internal combustion engine, a valve shiftable to decrease the effective flow area of said conduit in response to increasing fluid flow, said valve comprising a scoop-shaped vane and a stabilizing vane in the path of fluid flow, means for supporting said vanes for movement, means positioned between said vanes whereby four-point closing of said valve may be accomplished, said valve being actuated during its initial movement from full open position by substantially the velocity of said fluid alone, means to yieldingly oppose closing movement of said valve during said initial movement, and additional yielding means to oppose further closing movement of said valve effective when said valve has been closed to an extent to set up a pressure differential on the opposite sides thereof in said conduit, said additional yielding means being arranged to oppose the additional force set up by said pressure differential tending to effect closing movement of said valve.

7. In combination with a fuel intake conduit of an internal combustion engine, a vane mounted for oscillation on a transverse axis in said conduit and arranged to be in angular relation to the longitudinal axis of said conduit throughout a major portion of its range of oscillation whereby the portion of the fuel flow flowing against said vane will be diverted from its normal path of flow and concentrated in a portion of the cross-sectional area of said conduit, flow responsive means positioned in a portion of said conduit for limiting the maximum speed of said engine, said flow responsive means comprising a valve structure mounted to oscillate about an axis transverse of said conduit, said valve structure having a portion thereof removed adjacent said axis to form an open space immediately adjacent said axis, the transverse axes of said vane and said flow responsive means being disposed in a plane substantially parallel to the longitudinal axis of said conduit and closely adjacent to one another so that said means may be engaged by fuel flow concentrated by said vane.

8. In a throttling device for controlling the flow of fluid through a conduit, a flow responsive valve comprising a scoop-shaped power element leading into the flow of fluid, the concave portion thereof facing in a direction opposite to the direction of the flow of fluid, and a stabilizing element leading away from the flow of fluid, means for supporting said elements for movement and means positioned between said elements whereby four point closing of said flow-responsive valve is accomplished.

9. In a throttling device for controlling the flow of fluid through a conduit, a flow responsive valve comprising a power element leading into the flow of fluid and a stabilizing element leading away from the flow of fluid, said elements being arranged in angular relation with respect to one another, means for supporting said elements for movement and means positioned between said elements whereby four point closing of said flow responsive valve is accomplished.

10. In a throttling device for controlling the flow of fluid through a conduit, a flow responsive valve comprising a power element leading into the flow of fluid and a stabilizing element leading away from the flow of fluid, means for supporting said elements for movement, said means being eccentrically mounted with respect to the center of said conduit and means positioned between said elements whereby four point closing of said flow-responsive valve is accomplished.

11. In a throttling device for controlling the flow of fluid through a conduit, a flow responsive valve comprising a power element leading into the flow of fluid and a stabilizing element leading away from the flow of fluid, means for supporting said elements for movement, and means positioned between said elements whereby four-point closing of said flow-responsive valve is accomplished, said latter means being eccentrically mounted with respect to the center of said conduit.

12. In a throttling device for controlling the flow of fluid through a conduit, a flow responsive element comprising a curved scoop-shaped vane leading into the flow of fluid and a substantially flat stabilizing vane leading away from the flow of fluid, means positioned between said vanes for supporting them for rotation and a stationary bridge adjacent said supporting means whereby four-point closing of said element is obtained.

13. In a throttling device for controlling the flow of fluid through a conduit, a flow responsive element comprising a curved scoop-shaped vane leading into the flow of fluid and a substantially flat vane leading away from the flow of fluid, means positioned between said vanes for supporting them for rotation and a stationary bridge adjacent said supporting means whereby four-point closing of said element is accomplished, said supporting means and said bridge being eccentrically mounted with respect to the center of said conduit.

14. In a throttling valve construction for governing the flow of fluid through a conduit, a pivoted valve structure mounted for oscillation within said conduit, said valve structure comprising spaced interconnected members forming a power vane and a stabilizing vane, said power vane and stabilizing vane being set at an acute angle to each other on opposite sides of the valve pivot with the vertex of said acute angle on the side of the pivot adjacent the stabilizing vane.

15. In a throttling device for controlling fluid flow through a conduit, a valve structure movable within said conduit, said valve structure comprising a substantially semi-cylindrical vane leading into the flow of fluid the concave portion thereof facing in a direction opposite to the direction of the flow of fluid.

16. In a throttling device for controlling fluid flow through a conduit, a valve structure movable within said conduit, said valve structure comprising a scoop-shaped vane leading into the flow of fluid, the concave portion thereof facing in a direction opposite to the direction of fluid flow, and a stabilizing vane leading away from the flow of fluid.

17. In a throttling device for controlling fluid flow through a conduit, a valve structure mounted for oscillation on an axis in said conduit, said valve structure comprising a scoop-shaped vane mounted to oscillate about said axis and mounted in a plane offset from said axis, the concave portion thereof facing in a direction opposite to the direction of the flow of fluid through said conduit.

18. In a throttling device for controlling fluid flow through a conduit, a valve structure mounted for oscillation on an axis in said conduit, said valve structure comprising a scoop-shaped vane with the concave portion thereof facing in a direction opposite to the direction of the flow of fluid, and a stabilizing vane both vanes being mounted to oscillate about said axis and mounted in intersecting planes offset from said axis.

19. In a throttling device for controlling fluid flow through a conduit, a valve structure mounted for oscillation about an axis in said conduit, said valve structure comprising a scoop-shaped vane having its outer periphery arranged to engage with the adjacent wall of said conduit and its inner periphery spaced from said axis to provide an opening between said axis and said inner periphery.

20. In a throttling device for controlling fluid flow through a conduit, a valve structure mounted for oscillation on an axis in said conduit, said valve structure comprising a scoop-shaped vane mounted to oscillate about said axis and mounted in a plane offset from said axis, the inner periphery of said vane being spaced from said axis, said vane being arranged with the concave portion thereof facing in a direction opposite to the direction of fluid flow through said conduit.

21. In a throttling valve construction for governing the flow of fluid through a conduit wherein the valve is actuated by the flow of fluid through said conduit, a pivoted valve structure mounted for oscillation within said conduit, said valve structure comprising a power vane and a stabilizing vane spaced apart to define an open space therebetween and set at an acute angle relative to one another on opposite sides of the valve pivot.

22. In combination with a fuel intake conduit of an internal combustion engine, a vane mounted for oscillation in said conduit and arranged to be in angular relation to the longitudinal axis of said conduit throughout a major portion of its range of oscillation whereby the portion of the fuel flow flowing against said vane will be diverted from its normal path of flow and concentrated in a portion of the cross-sectional area of said conduit, a flow responsive means positioned in a portion of said conduit for limiting the maximum speed of said engine, said means comprising a pivoted vane located closely adjacent said first-mentioned vane and arranged with respect to the latter so as to be engaged by fuel flow concentrated thereby, a portion of said vane immediately adjacent said pivot being removed to form an open space between said pivot and the inner end of said vane.

23. In combination with means responsive to the rate of fluid flow in a conduit for governing said fluid flow through said conduit, a butterfly valve adjacent said governing means for controlling the fuel flow toward the latter, said butterfly valve being designed to direct a portion of the fluid flow to said governing means, when the butterfly valve opening is relatively small so as to insure responsiveness of the governing means at substantially all rates of flow.

WILLIAM E. LEIBING.

DISCLAIMER 2,026,947.—*William E. Leibing*, Sausalito, Calif. METHOD AND APPARATUS FOR GOVERNING FLOW LINES. Patent dated January 7, 1936. Disclaimer filed October 20, 1938, by the assignee, *Leibing Automotive Devices, Inc.*

Hereby enters this disclaimer to claim 23 in said specification.

[*Official Gazette November 15, 1938.*]